Jan. 26, 1937. M. R. BUTLER ET AL 2,069,004
TRAILER FOR ROAD VEHICLES
Original Filed July 18, 1935
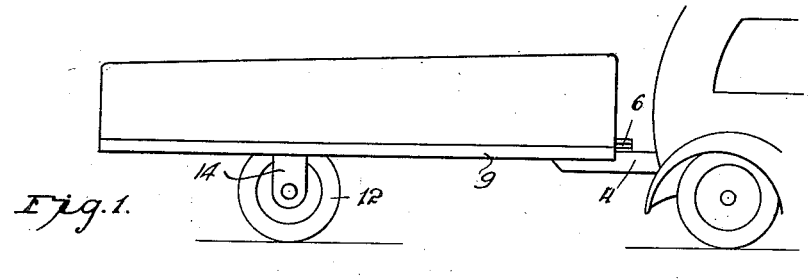
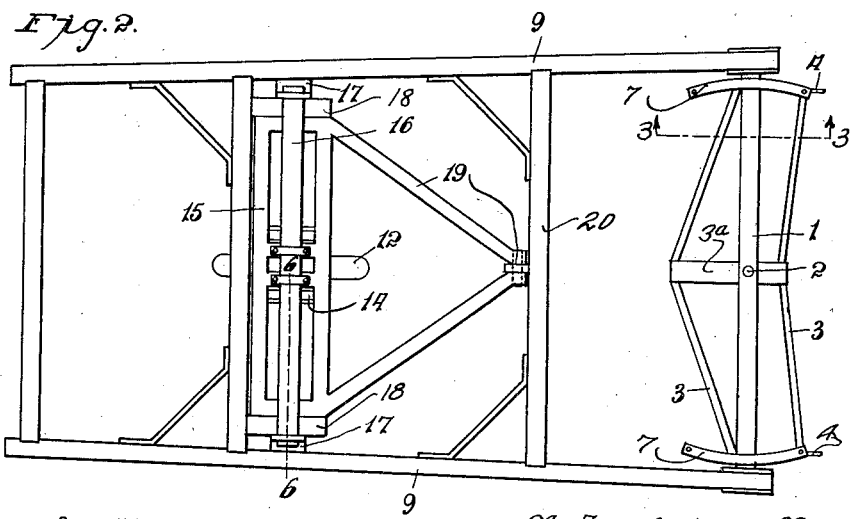
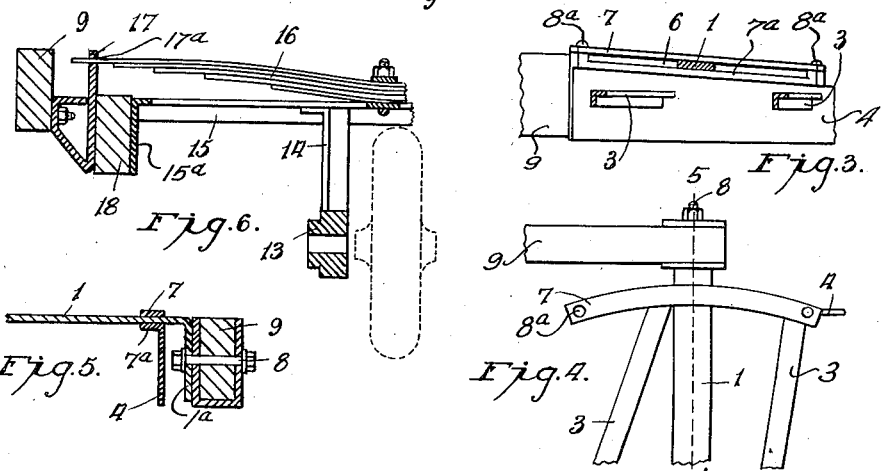
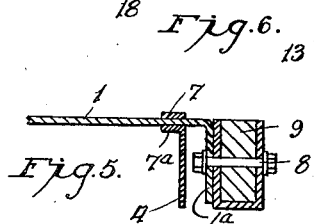
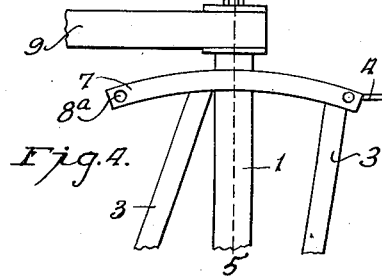
M. R. Butler
W. H. Harding
INVENTORS
By Glascock Downing Seebold
Attys.

Patented Jan. 26, 1937

2,069,004

UNITED STATES PATENT OFFICE 2,069,004

TRAILER FOR ROAD VEHICLES

Martin Ronald Butler, Wellington, and William Henry Harding, Levin, New Zealand, assignors to Reversible Trailers Limited, Levin, Province of Wellington, New Zealand, a company incorporated in New Zealand Original application July 18, 1935, Serial No. 32,080. Divided and this application February 3, 1936, Serial No. 62,182. In New Zealand August 10, 1934

5 Claims. (Cl. 280—33.44)

This application is a division of our application Serial No. 32,080 filed July 18, 1935, and the invention relates to trailers for road vehicles.

The object of the present invention is to enable the trailer to be supported by the drawing vehicle but to have free horizontal and vertical movement in relation thereto.

According to the present invention, a trailer coupling is provided consisting of a transverse draw bar pivoted at its centre to a frame fixed to the vehicle. The ends of this draw bar are guided in members fixed on the end of the frame and are pivoted to the trailer body and support the trailer laterally, provision being made to permit the cross bar to assume the necessary transverse angle when rounding a curve and also of any accentuated angle, such as when the vehicle is travelling around a corner where one side of the road is higher than the other.

The invention will be described with the aid of the accompanying drawing, wherein:—

Figure 1 is an elevation showing a trailer attached to a vehicle.

Figure 2 is a plan of a trailer but not showing the floor or sides, these being of approved form.

Figure 3 is a cross section on line 3—3 Figure 2, but drawn to a larger scale than the preceding views.

Figure 4 is an enlarged plan of the portion shown in Figure 3.

Figure 5 is a cross section on the line 5—5 of Fig. 4 showing the pivoting of the cross bar to the trailer frame.

Figure 6 is a cross section on the line 6—6 of Fig. 2 showing how the under carriage is connected to the frame of the trailer by means of a spring.

Referring to the drawing, the coupling for the trailer consists of a transverse trailer draw bar 1 pivoted at its center on a pin 2 carried by a member 3a of a frame which also includes bars 3 and end plates 4, the parts 3, 3a and 4 being attached to each other by welding. The end plates 4 are bolted to a convenient part of the rear of the vehicle chassis, or to brackets attached to the rear thereof, according to the type of vehicle to which it is applied. The end plates 4 are arcuate, and have fixed to their upper edges by welding, arcuate guide members 7a, while complementary arcuate guide members 7 are fixed thereto by studs 8a, the members 7a being cut away so as to leave slots 6 between each two members. The ends of the draw bar 1 slide in the slots 6, which latter extend in their arcuate form a distance which permits the bar 1 to rotate on the pivot 2 and enables the trailer to follow the drawing vehicle during any turning movement of such vehicle.

These arcuate guide members in a rearward direction slope upwards from the horizontal, as indicated in Figure 3, so that when the draw bar 1 rotates on its pivot 2, a tilting action is obtained which will permit the bar 1 to take the required transverse angle in relation to the frame. The bearing for the bar 1 about the pivot 2 is disposed at the same inclination as the slots 6. The bar 1 has downwardly projecting ends 1a pivoted by means of pins 8 (Figure 5) to the side members 9 of the trailer frame in order to allow the necessary flexibility between the trailed and the drawing vehicle.

At a convenient point near the rear of the trailer, a trailed wheel 12 is mounted by means of suitable bearings 13 carried by members 14 depending from a transverse wheel frame 15 which carries a spring 16. The ends of the spring pass through slots 17a of brackets 17 fixed to the side members 9 of the body of the trailer. A block 18 fixed on the side of each bracket 17 may slide against the depending end 15a of the frame 15. These blocks act as lateral guides.

The front end of the frame 15 extends forwardly and is pivoted at 19 to a transverse member 20 of the body of the trailer frame so that vertical movement of the rear end of the frame can take place.

This arrangement of a central wheel, together with the use of the draw bar 1, having its ends free to move in the sloping guide slots 6, enable the frame of the trailer to assume the transverse plane of the drawing vehicle when rounding a curve, and also any accentuated angle, such as when the vehicle is travelling around a curve where one side of the road is higher than the other.

The guides 7 and 7a retain the trailer in an upright position, while the draw bar 1 being pivoted at its center, allows the horizontal turning movement to take place between the trailer and the vehicle, while the provision of the axis at 8 allows for free movement of the trailer about such axis.

What we claim is:—

1. A trailer for vehicles comprising a coupling frame adapted to be fixed to the drawing vehicle, guide members at the ends of said frame containing slots sloping upwardly in the rearward direction, a trailer frame, a transverse draw bar pivoted centrally to said frame and having the end portions thereof guided in said slots, and means connecting said draw bar to said trailer frame.

2. A trailer as claimed in claim 1 characterized in that the last mentioned means is constituted by a horizontally disposed pivotal connection.

3. A trailer as claimed in claim 1 characterized in that said guide members are of arcuate form.

4. A trailer as claimed in claim 1 characterized by the provision of a single road wheel carried by and supporting said trailer frame.

5. A trailer as claimed in claim 1 characterized by the provision of a wheel frame movably carried by the transverse frame, a supporting wheel carried by said wheel frame, and a spring interposed between the wheel frame and the trailer frame.

MARTIN RONALD BUTLER.
WILLIAM HENRY HARDING.